United States Patent [19]

Asano

[11] Patent Number: 5,048,933
[45] Date of Patent: Sep. 17, 1991

[54] TRANSMISSION TYPE LIQUID CRYSTAL DISPLAY DEVICE

[75] Inventor: Kazuo Asano, Hachioji, Japan

[73] Assignee: Konica Corporation, Tokyo, Japan

[21] Appl. No.: 506,802

[22] Filed: Apr. 10, 1990

[30] Foreign Application Priority Data

Apr. 14, 1989 [JP] Japan .................................. 1-92926

[51] Int. Cl.$^5$ .............................................. G02F 1/13
[52] U.S. Cl. ................................... 350/347 E; 359/63; 359/93; 359/102
[58] Field of Search ............... 350/340, 341, 334, 337, 350/339 R, 347 E, 347 R, 345, 346

[56] References Cited

U.S. PATENT DOCUMENTS

| | | | |
|---|---|---|---|
| 4,579,425 | 4/1986 | Ishii et al. | 350/341 |
| 4,634,229 | 1/1987 | Amstutz et al. | 350/341 |
| 4,664,482 | 5/1987 | Kando et al. | 350/337 |
| 4,759,612 | 7/1988 | Nakatsuka et al. | 350/337 |
| 4,799,774 | 1/1989 | Baur et al. | 350/341 |
| 4,886,344 | 12/1989 | Scheuble et al. | 350/347 R |
| 4,909,605 | 3/1990 | Asano et al. | 350/341 |
| 4,974,940 | 12/1990 | Asano et al. | 350/347 E |

FOREIGN PATENT DOCUMENTS

| | | | |
|---|---|---|---|
| 0259822 | 6/1988 | European Pat. Off. | |
| 0274924 | 11/1988 | Japan | 250/347 R |
| 0000514 | 1/1989 | Japan | 350/337 |
| 62-188644 | 1/1989 | Japan | |

OTHER PUBLICATIONS

Schadt et al., "Electro Optical Performance of New, . . . Liquid Crystal Display", Appl. Phys. Lett 50, Feb. 1987.
Patent Abstracts of Japan, vol. 12, No. 264 (P-734).
Patent Abstracts of Japan, vol. 12, No. 97 (P-682).

Primary Examiner—Rolf Hille
Assistant Examiner—Tan Ho
Attorney, Agent, or Firm—Finnegan, Henderson, Farabow, Garrett and Dunner

[57] ABSTRACT

There is disclosed the transmission type liquid crystal display device having a high contrast and an excellent achromatic property. The display device comprises a liquid crystal cell, a pair of the polarizing plates and a backlight source, and is characterized by:

(1) the product $\Delta n \cdot d$, in which $\Delta n$ is a refractive anisotropy of the nematic liquid crystal and d is a thickness of the liquid crystal layer, is 0.65 to 0.90 $\mu$m;

(2) in the relation to the twist angle $\alpha$, the setting angles $\beta$ and $\gamma$ of the polarizing plates and a correction angle $\delta$ satisfy the following Equations (a) and (b):

$\alpha + \beta - \gamma - 180° = 90° - 60° < \delta < 30°$  Equation (a)
$\beta + \gamma = +90°$ or $-90°$;  Equation (b)

(3) a pretilt angle $\theta_0$ of the nematic liquid crystal molecules contacting the electrode substrate is not less than 10°;

(4) luminous intensity ratios of red light to green light and red light to blue light in the backlight source are 1.2 or more; and (5) a luminous intensity of the backlight source is not less than 200 cd/m$^2$.

20 Claims, 9 Drawing Sheets

TRANSMISSION TYPE LIQUID CRYSTAL DISPLAY DEVICE

FIELD OF THE INVENTION

The present invention relates to a transmission type liquid crystal display device associated with a normally open display mode which is applicable to various types of display device.

BACKGROUND OF THE INVENTION

Hitherto there have been disclosed the SBE (Supertwisted Birefringence Effect) type liquid crystal display devices which are known as a liquid crystal display device capable of providing a high contrast and large capacity display in multiplex driving at a high duty ratio.

However, the SBE type liquid crystal display devices are liable to have a displayed image and a background tinted with a specific color because the devices utilize a birefringence effect. This is liable to cause the following problems: (1) deterioration in display quality, (2) little flexibility to meet users' color requirements, and (3) difficulty in color display.

To solve a tinting problem and provide a clear black-and-white display, the following techniques have been proposed:

1. a dual cell mode where a dual cell is structured by disposing one liquid crystal cell on the other cell containing the liquid crystal layer twisted to the direction reverse to that of the liquid crystal layer in the former cell in order to prevent tinting by using the other liquid crystal cell as an optical compensating plate (Nikkei Micro-Device Oct. 1987 issue, pp. 84–88.), and 2. a phase plate mode where tinting is prevented by substituting a phase plate comprising a birefringent film for the liquid crystal cell of optical compensation used in the above dual cell mode.

In the above dual cell mode, a production cost and a weight of the device increase more than those of the device composed of a single liquid crystal cell and, because of the difficulty to efficiently make the thicknesses of both crystal cells uniform, it is hard to mass-produce the liquid crystal display devices having the uniform display characteristics.

In the phase plate mode, because of the difficulty to uniformly control the birefringence of a phase plate in a wide area, a color unevenness is liable to occur. Further, because of the difficulty to completely compensate the birefringence of a liquid crystal cell for display, tinting can not satisfactorily be prevented.

There has recently been the requirement for a large capacity liquid crystal display device having a large number of picture elements. In order to meet this requirement, it is necessary to drive a liquid crystal display device at a higher duty ratio, and so to sharpen an intensity variation of transmitted light through a liquid crystal cell to a driving voltage. To satisfy the above requirements, it is effective to make a pretilt angle and a twist angle larger.

In the above dual cell and phase plate modes, there is used a normally closed display mode where light is not transmitted when applying an OFF voltage and light is transmitted when applying an ON voltage, so that a larger pretilt angle is liable to increase leaked light in applying an OFF voltage and decrease the contrast of a displayed image, as shown in FIG. 1.

On the other hand, Japanese Patent Publication Open to Public Inspection (hereinafter referred to as Japanese Patent O.P.I. Publication) No. 63-274927/1988 discloses a technique for providing a single liquid crystal display device of a normally open display mode with an improved achromatic property by optimizing a value of $\Delta n \cdot d$ and a setting angle of a polarizing plate. This technique, however, is liable to provide a darker display and a contrast not higher than 20 since $\Delta n \cdot d$ is set at a small value.

SUMMARY OF THE INVENTION

It is an object of the invention to provide a transmission type liquid crystal display device capable of giving a display with a higher contrast and an excellent achromatic property in multiplex driving at a high duty ratio.

The object of the invention can be achieved by a transmission type liquid crystal display device comprising:

a liquid crystal cell having a liquid crystal layer in which a nematic liquid crystal containing an optically active substance and having a positive dielectric anisotropy forms a twisted structure with a twist angle $\alpha$ ranging from 220° to 300° and is disposed between a pair of parallel electrode substrates each having a transparent substrate and provided thereon an electrode layer and an alignment layer so that the respective alignment layers contact the liquid crystal layer;

a pair of front and rear polarizing plates each disposed on the side of the substrate opposite to the alignment layers; and a backlight source disposed on the side of the rear polarizing plate opposite to the substrate, wherein (1) the product, $\Delta n \cdot d$, in which $\Delta n$ is a refractive anisotropy of a nematic liquid crystal and d (μm) is a thickness of the liquid crystal layer, is 0.65 to 0.90 μm;

(2) in the relation to the twist angle $\alpha$, the angles $\beta$ and $\gamma$ defined by the intersections of the polarizing axes of the polarizing plates and the directions of aligning treatments of the electrode substrates adjacent to the respective polarizing plates, and a correction angle $\delta$ satisfy the following equations (a) and (b):

$$\alpha + \beta - \gamma - 180° = 90° - \delta\quad -80° < \delta < 30° \quad \text{Equation (a)}$$

$$\beta + \gamma = +90° \text{ or} -90; \quad \text{Equation (b)}$$

(3) a pretilt angle $\theta_0$ defined by the intersection of the electrode substrate and a director of liquid crystal molecules contacting with the electrode substrate is not less than 10°;

(4) the luminous intensity ratios of red light to green light and red light to blue light in the backlight source are 1.2 or more; and (5) a luminous intensity of the backlight source is not less than 200 cd/m².

It is preferred to provide a light-shielding layer on the non-picture element areas of the electrode substrate.

It is also preferred to provide at least three different color filters corresponding to the respective picture element.

10—Liquid crystal cell
11, 12—Electrode substrates
11A, 12A—Transparent substrates
11B, 12B—Electrode layers
11C, 12C—Alignment layers
12D—Light shielding layer
13—Liquid crystal layer
15—Shielding means
16—Spacer
21—Front polarizing layer
22—Rear polarizing layer
30—Backlight source
41—Driving circuit
51, 52—Alignment layers
53, 54—Electrode substrates
55—Liquid crystal layer
56—Nematic liquid crystal
57—Spacer
58, 59—Polarizing plates
60—Tubular light source
61—Guide plate
62—Reflection plate
63—Scattering plate

DETAILED DESCRIPTION OF THE INVENTION

Figure 1:
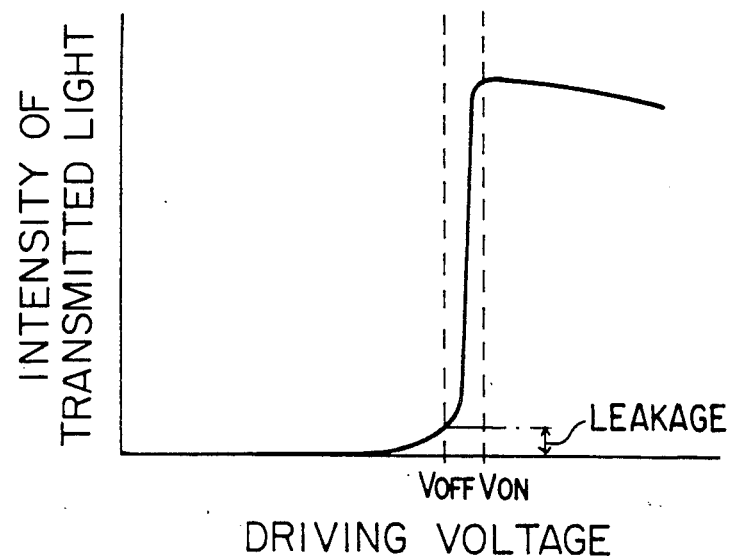
FIG. 1 illustrates the relation between a voltage and a transmitted light intensity in a normally closed display mode.
Figure 2:
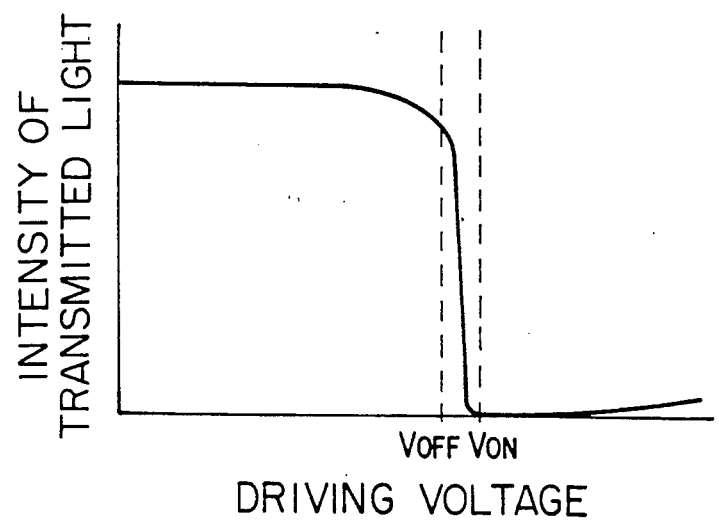
FIG. 2 illustrates the relation between a voltage and a transmitted light intensity in a normally open display mode.

The angles $\beta$ and $\gamma$ of the polarizing plates are in the specific range, so that the liquid crystal display device can have the normally open display mode where light is transmitted in applying an OFF voltage and no light is transmitted an ON voltage is applied, as shown in FIG. 2, and can provide a sufficiently high contrast. Such a high contrast is not lowered by leaked light even in a multiplex driving at a high duty ratio because that the pretilt angle $\theta_0$ is set at as large as not less than 10. As a result, a high contrast and large capacity display can be provided in multiplex driving at a high duty ratio.

$\Delta n \cdot d$ and the angles $\beta$ and $\gamma$ are in the specific ranges, respectively, and the luminous intensity ratios of red light in the backlight source are 1.2 or more, so that the displaying color of the liquid crystal display can give an excellent achromatic property applying an OFF voltage.

The luminous intensity of the backlight source is not less than 200 cd/m², so that tinting can be satisfactorily prevented without any adverse influence exerted by surrounding light incident in and reflected from the liquid crystal cell.

Further, a light-shielding layer may be provided on the non-picture element areas of an electrode substrate, which results in preventing light leakage from the non-picture element areas and further increasing the contrast of the whole display in a normally open display mode.

There are provided at least three different color filters corresponding to the respective picture elements, so that full color images can be displayed with a high purity.

Figure 3:
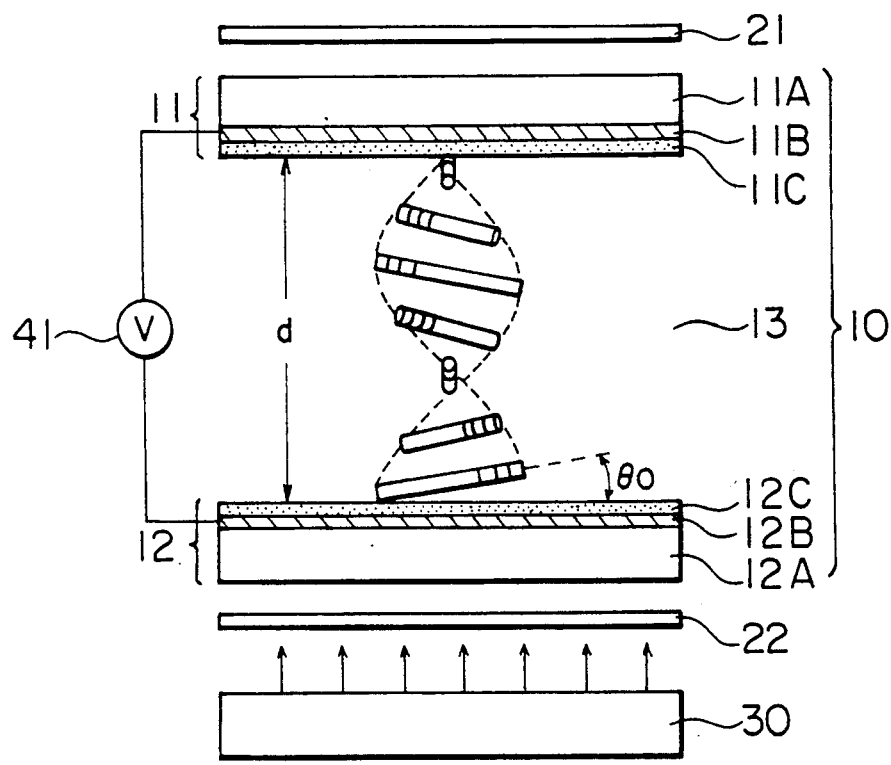
FIG. 3 schematically shows a transmission type liquid crystal display device of this invention.

As shown in FIG. 3, the transmission type liquid crystal display device of the invention basically comprises:

A liquid crystal cell 10 having a liquid crystal layer 13 in which a nematic liquid crystal containing an optically active substance and having a positive dielectric anisotropy forms a twisted structure with a twist angle $\alpha$ ranging from 220° to 300° and is disposed between a pair of parallel electrode substrates 11, 12 having the transparent substrates 11A, 12A and provided thereon the electrode layers 11B, 12B and the alignment layers 11C, 12C so that the respective alignment layers contact the liquid crystal layer;

a pair of front and rear polarizing plates 21, 22 each disposed on the side of the electrode substrate opposite to the alignment layer;

a backlight source 30 disposed on the side of the rear polarizing plate 22 opposite to the substrate. The display device is driven with a driving circuit 41.

In the invention, the nematic liquid crystal containing the optically active substance and having a positive dielectric anisotropy has the twist angle $\alpha$ in the range of 220° to 300°, and more preferably 250° to 270°. When satisfying the above requirements, a transmitted light intensity is varied sharply in relation to a voltage variation. If the twist angle $\alpha$ is too small, the transmitted light intensity is varied slowly and the contrast is lowered. On the other hand, if it is too large, the alignment of the liquid crystal molecules becomes irregular when switching ON and OFF, so that the display quality is deteriorated. In the twist angle $\alpha$ ranging from 250° to 270°, a light leakage in applying an ON voltage can be minimized and the highest contrast can be obtained.

The twist angle $\alpha$ can be determined by the alignment directions of the alignment layers provided on the respective electrode substrates, and the kinds and quantities of the nematic liquid crystal and the optically active substances added thereto. The twist direction of the nematic liquid crystal may be either clockwise or counter-clockwise to the direction of incident light.

In the invention, the product $\Delta n \cdot d$, in which $\Delta n$ is a refractive anisotropy of a nematic liquid crystal and $d(\mu m)$ is L a thickness of a liquid crystal layer, is 0.65~0.90 $\mu m$. $\Delta n \cdot d$ in the above range contributes not only to effectively preventing tinting but also to sufficiently increasing the light transmittance in the whole wavelength region of visible light and provide a high contrast display.

Figure 4:
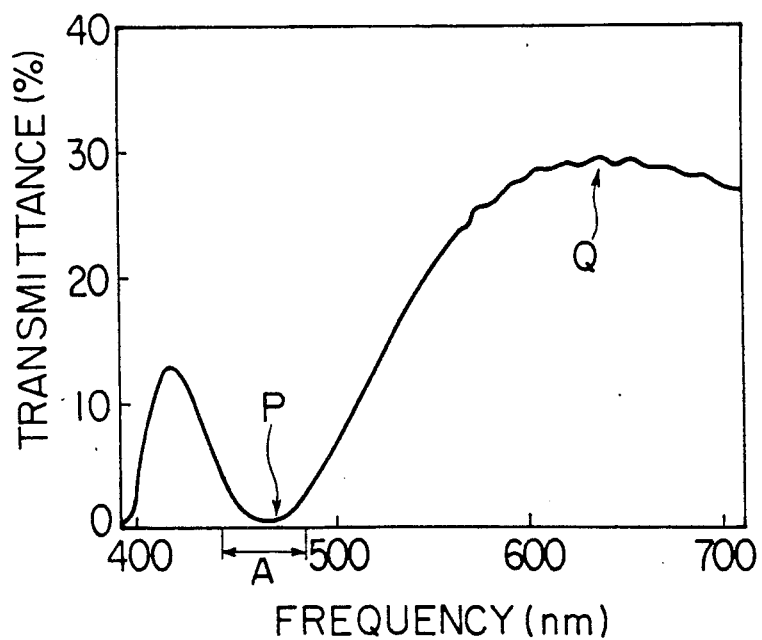
FIG. 4 illustrates the distribution of a transmission spectrum in a conventional type liquid crystal cell.

A conventional SBE type liquid crystal cell has a nontransmission spectral region A on the short wavelength side of the visible wavelength region of the transmission spectrum as shown in FIG. 4, in which almost no light can be transmitted. The non-transmission spectral region A is shifted to a shorter wavelength region by decreasing the value of Δn·d. However, too small Δn·d decreases the whole light transmittance in the visible wavelength region of 400 to 700 nm, so that the brightness in the light transmitting state becomes insufficient. Therefore, Δn·d is preferably in the range of 0.65 to 0.90 μm.

The optimum value of Δn·d relates to an average tilt angle $\theta^{OFF}$ of a liquid crystal in applying an OFF voltage, and the more the average tilt angle $\theta^{OFF}$ is, the larger the optimum value of Δn·d is. The results of experiments show that the excellent display characteristics can be obtained when Δn·d and $\theta^{OFF}$ satisfy the following equation;

$$\Delta n \cdot d \cdot \cos^2 \theta^{OFF} \approx 0.68 \pm 0.05 \ \mu m$$

Δn is a value of a reflective anisotropy of a nematic liquid crystal containing an optically active substance, and can be replaced with that of the liquid crystal containing no optically active substance since the content thereof is usually 5 weight %. The average tilt angle $\theta^{OFF}$ is an average value of the angle defined by the intersection of a director of liquid crystal molecules in applying an OFF voltage and an electrode substrate. The average tilt angle $\theta^{OFF}$ depends on the kind of the alignment layer, the pretilt angle, the physical properties of the nematic liquid crystal, and an applied voltage.

Figure 15:
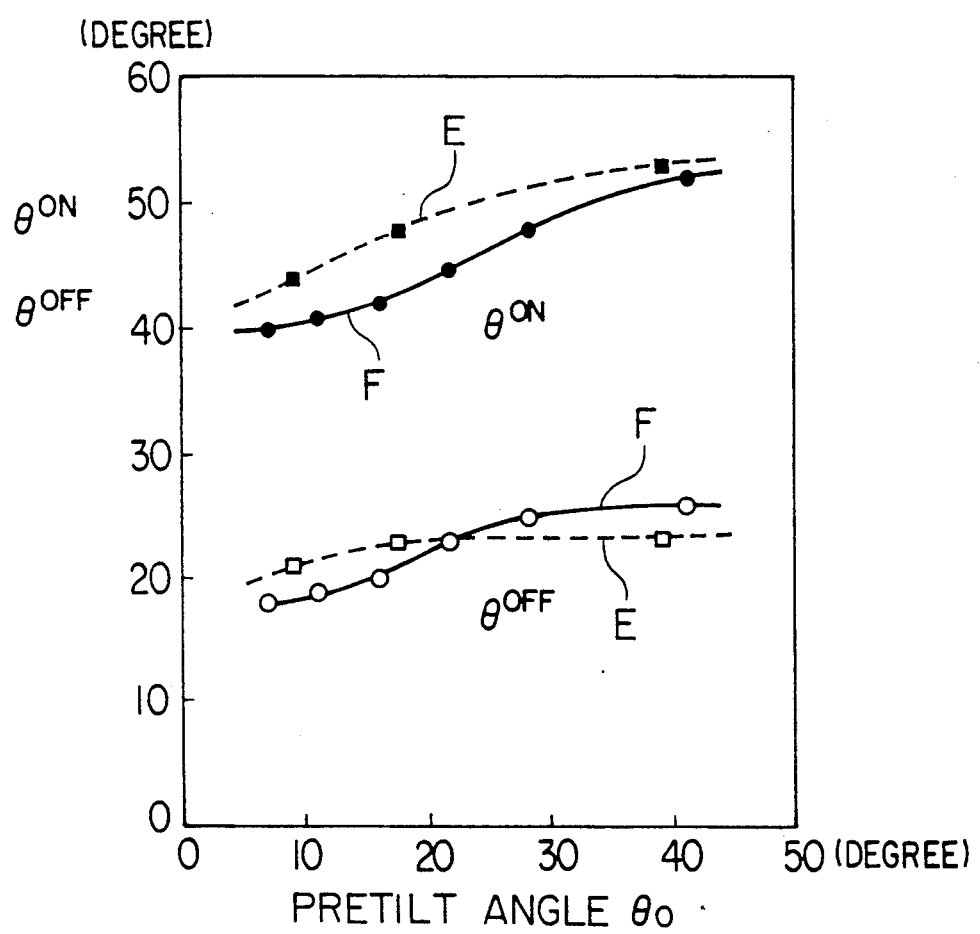
FIG. 15 illustrates the relation between a pretilt angle $\theta_0$ and average tilt angles $\theta^{ON}$ and $\theta^{OFF}$.

FIG. 15 illustrates a relation between the average tilt angles and pretilt angles $\theta_0$ of liquid crystals ZLI-2293 made by Merck and CR-4008 made by Chisso in applying an OFF voltage and an ON voltage in multiplex driving at a duty ratio of 1/100, wherein curves E and F correspond to ZLI-2293 and CR-4008, respectively. The larger the pretilt angle $\theta_0$ is, the larger the average tilt angle $\theta^{OFF}$ is and, therefore, the larger the pretilt angle $\theta_0$ is, the larger the optimum Δn·d value is.

In the invention, in the relation to the twist angle α, the following Equations (a) and (b) are satisfied by the angles β and γ defined by the intersection of the polarizing axes of a pair of polarizing plates and the direction of aligning treatments of the electrode substrates adjacent to the respective polarizing plates, and the correction angle δ:

$$\alpha + \beta - \gamma - 180° = 90° - \delta (0° < \delta < 30°) \quad \text{Equation (a)}$$

$$\beta + \gamma = +90° \text{ or } -90° \quad \text{Equation (b)}$$

The angles β and γ set at the above range enables to display in a normally open display mode in which light leakage is lowered, and therefore to provide a color display with a higher color purity by combining the three color filters of red, green and blue.

In combining a liquid crystal cell containing a nematic liquid crystal of a twisted structure with a pair of polarizing plates, and the angle β of one polarizing plate in the relation to the twist angle α of the liquid crystal layer can be determined by the above-given equation (a), which can minimize the transmittance in a non-light transmission state, provided that the distortion angle β of the other polarizing plate is fixed. According to Equation (a), light leakage in the non-light transmission state can be decreased by selecting the angles β and γ in the relation to the twist angle α. The correction angle δ depends on the average tilt angle $\theta^{ON}$ of the liquid crystal molecules in the non-light transmission state. The average tilt angle $\theta^{ON}$ getting closer to 90° makes the δ value closer to 0°. The average tilt angle $\theta^{ON}$ is an average value of the angle defined by the intersection of the electrode substrate and the director of liquid crystal molecules in applying an ON voltage.

In Equation (a), the left side is equal to an angle made by the polarizing axes of the pair of polarizing plates. Therefore, if the liquid crystal molecules in a liquid crystal layer are completely aligned along an electric field in applying an ON voltage ($\theta^{ON} = 90°$), light leakage in the nonlight transmission state can be minimized when the left side of the Equation (a) is equal to 90°. However, when applying the ON voltage, the liquid crystal molecules are usually not aligned completely in a vertical direction ($\theta^{ON} = 90°$), and therefore, the liquid crystal layer shows a slight retardation for incident light. For minimizing the light leakage in the non-light transmission state, the value of the left side of Equation (a) should be shifted to smaller value from 90° by the correction angle δ according to the average tilt angle $\theta^{ON}$ in order to offset an optical activity caused by the retardation. The shifting direction has to be such that the value δ is positive.

Figure 5:
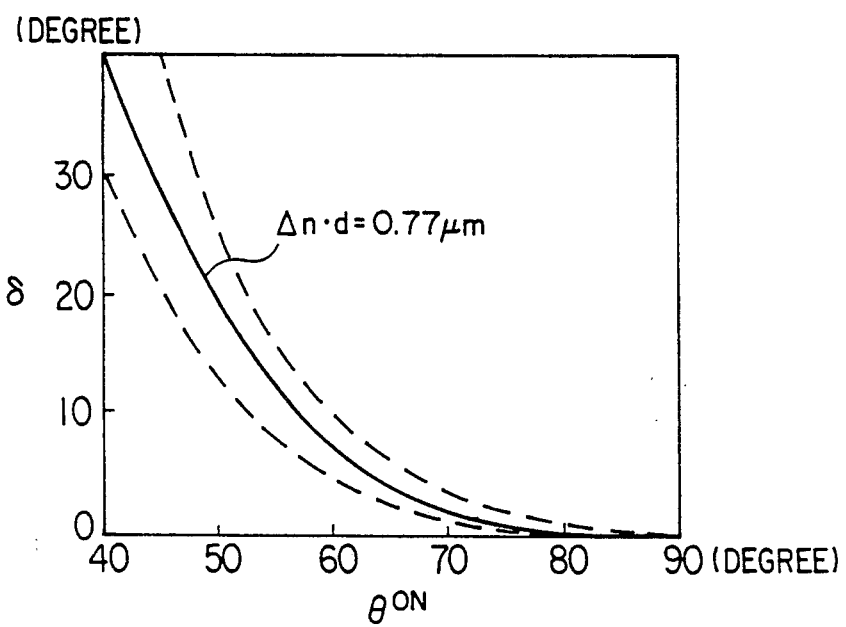
FIG. 5 illustrates the relation between an average tilt angle $\theta^{ON}$ in applying an ON voltage and $\delta$.

FIG. 5 illustrates the correlation between the value δ and the average tilt angle $\theta^{ON}$ in applying the ON voltage, wherein the solid line indicates the correlation between the average tilt angle $\theta^{ON}$ in applying the ON voltage and the value δ, provided that Δn·d is 0.77 μm, and the broken line indicates the range of the variation of δ and $\theta^{ON}$ according to Δn·d in the range of 0.65 to 0.90 μm.

Though it is hard to practically measure the average tilt angle $\theta^{ON}$, it can be estimated by measuring the retardation shown by a liquid crystal cell. FIG. 15 illustrates the correlations between the average tilt angles $\theta^{ON}$ and the pretilt angles $\theta_0$ of the two kinds of liquid crystals, wherein it can be found that the larger the pretilt angle $\theta_0$ is, the larger the average tilt angle $\theta^{ON}$ is.

The light leakage in the non-light transmission state can be further diminished and the contrast can be increased by setting the angle β in accordance with the following equation (c):

$$\beta = \frac{360° - \alpha}{2} - \frac{\delta}{2} \quad \text{Equation (c)}$$

In order to practically perform a multiplex driving at a 1/100 duty ratio and make the contrast not less than 30, it is required that the liquid crystal layer shows a slight bistable phenomenon when applying a driving voltage.

Figure 6:
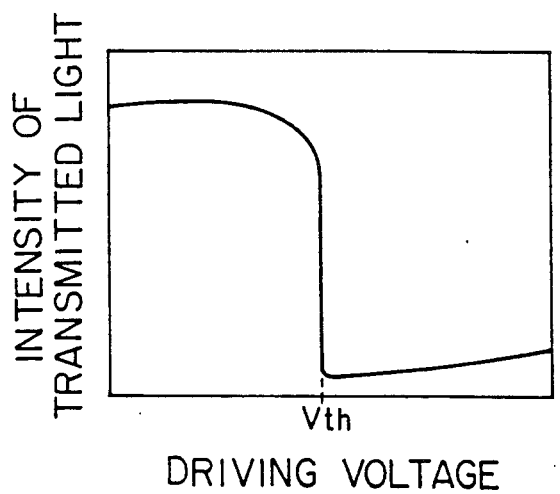
FIG. 6 illustrates a bistable phenomenon.

The bistable phenomenon, is defined by a phenomenon where, as shown in FIG. 6, there is observed a shift of a threshold voltage of a driving voltage when switching ON to OFF and OFF to ON. When the bistable phenomenon occurs, an intensity of transmitted light relative to a driving voltage changes sharply at the threshold voltage $V_{th}$.

Figure 7:
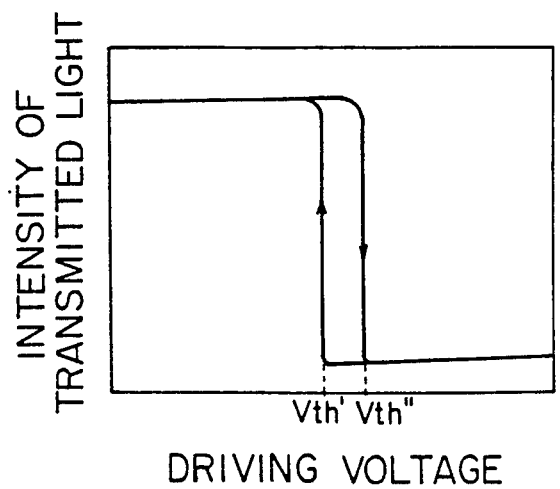
FIG. 7 illustrates a hysteresis of a bistable phenomenon.

To cause the slight bistable phenomenon, the twist angle α has to be not less than 220°. However, as shown in FIG. 7, too large twist angle α makes the bistable phenomenon too large and the transmitted light intensity relative to the driving voltage exhibits a hysteresis phenomenon. As a result, the response speed of the liquid crystal layer to the ON-to-OFF and OFF-to-ON switching of a driving voltage in multiplex driving becomes slow. Therefore, the twist angle $\alpha$ has to be not larger than 300° in order to increase the response speed.

The brightness in the light transmission state can be maximized at the twist angle $\alpha$ of around $270° - \delta$. When the twist angle $\alpha$ is selected to this value, the contrast can further be increased.

The optimum value of the correction angle $\delta$ in the above Equation (a) is determined depending on the types of the alignment layers and the physical properties of the liquid crystal. In the same liquid crystal, the larger the pretilt angle $\theta_0$ is, the smaller the value $\delta$ becomes, and the smaller the value $\delta$ is, the smaller the light leakage in the non-light transmission state is. The liquid crystal cell having a larger $\delta$ value has larger light leakage in the non-light transmission state, and the liquid crystal cell having a $\delta$ value exceeding 30° can not provide any satisfactory contrast even if the other parameters are optimized. When the pretilt angle $\theta_0$ is not smaller than 10°, the $\delta$ value is in the range of $0° < \delta < 30°$. The larger the bistable phenomenon of the liquid crystal cell is, the smaller the $\delta$ value is.

As the $\delta$ value depends on the combination of the types of the alignment layers and liquid crystals, the optimum $\delta$ value has to be determined for each combination.

The optimum $\delta$ value is determined in the following manner.

The initial angles of a pair of the polarizing plates, are set as follows:

$$\beta = (360° - \alpha) / 2$$

$$\gamma = (\alpha - 180°) / 2$$

Next, while $\beta$ and $\gamma$ are gradually varied from the initial values according to the following equations, an intensity of light leakage in the non-light transmission state is monitored to determine a value of $\omega_0$ which is the value of $\omega$ in the minimum intensity thereof:

$$\beta = (360° - \alpha) / 2 - \omega$$

$$\gamma = (\alpha - 180°) / 2 + \omega$$

As can be understood from the foregoing Equation (a), the above $\omega_0$ corresponds to $\delta/2$, whereby the value $\delta$ can be determined.

Once the value $\delta$ is determined, an arbitrary optimum combination of $\beta$ and $\gamma$ can be determined according to Equation (a) using the $\delta$ value.

Then, the optimum values of the angles $\beta$ and $\gamma$ can be determined according to Equations (a) and (b). The maximum contrast can be obtained at the optimum values and a satisfactorily high contrast can also be obtained in the vicinities of the above optimum values. However, the contrast changes remarkably when the angles $\beta$ and $\gamma$ are deviated from the optimum values, and the angles $\beta$ and $\gamma$ deviated by ±5° or more from the respective optimum values can provide no satisfactory contrast.

The ON voltage is defined by an ON voltage $V_{ON}$ corresponding to an effective ON/OFF voltage ratio represented by:

$$V_{ON}/V_{OFF} = \left[ \frac{(N)^{\frac{1}{2}} + 1}{(N)^{\frac{1}{2}} - 1} \right]^{\frac{1}{2}}$$

in multiplex driving at a 1/N duty ratio, and is an ON voltage where a response time $t_{ON}$ in switching from the light transmission state to the non-light transmission state of a display becomes equal to a response time $t_{OFF}$ in switching from the non-light transmission state to the light transmission state.

In the invention, the pretilt angle defined by the intersection of an electrode substrate and the director of liquid crystal molecules contacting the electrode substrate is not less than 10°, preferably not less than 25°.

Light leakage in the non-light transmission state in applying an ON voltage depends on the pretilt angle $\theta_0$, and in order to reduce the light leakage, it is necessary to make the pretilt angle $\theta_0$ not less than 10°. The pretilt angle $\theta_0$ not less than 10°, can reduce the light leakage in the non-light transmission state to a sufficiently low level and make the contrast not lower than 30 practically in multiplex driving at a 1/100 duty ratio.

Figure 8:
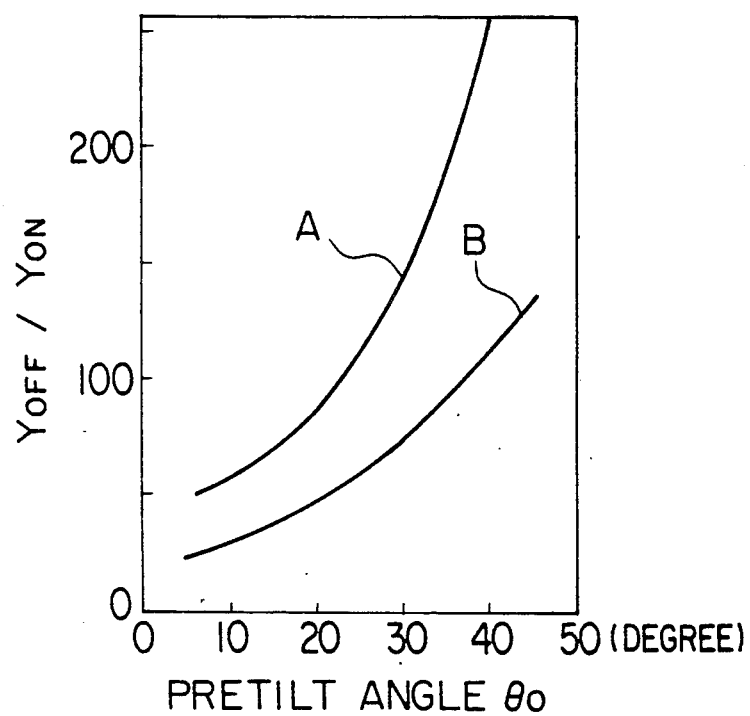
FIG. 8 illustrates the relation between a pretilt angle $\theta_0$ and a contrast.

FIG. 8 illustrates the actual relation between the pretilt angle $\theta_0$ and the contrast in multiplex driving at a 1/100 duty ratio, wherein curve A indicates the actual values in setting $\Delta n \cdot d$ at 0.79 $\mu$m with a nematic liquid crystal ZLI-2293 manufactured by Merck, and curve B indicates the actual values in setting $\Delta n \cdot d$ at 0.83 $\mu$m with a nematic liquid crystal CR-4008 manufactured by Chisso Co. As is understood from FIG. 8, the pretilt angle $\theta_0$ is not less than 10°, preferably not less than 25° in order to decrease the light leakage and increase the contrast.

Figure 9:
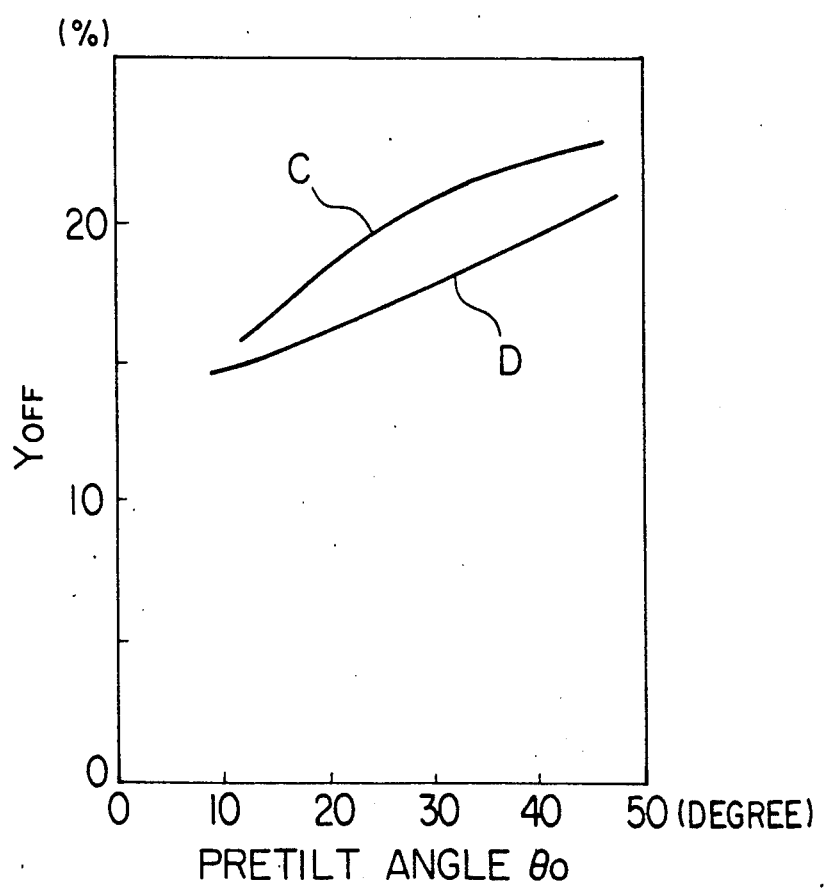
FIG. 9 illustrates the relation between a pretilt angle $\theta_0$ and the brightness in applying an OFF voltage.

FIG. 9 illustrates the actual relation between the pretilt angle $\theta_0$ and the brightness in multiplex driving at a 1/100 duty ratio, wherein curve C indicates the actual values in setting $\Delta n \cdot d$ at 0.79 $\mu$m with the nematic liquid crystal ZLI-2293 manufactured by Merck, and curve D indicates the actual values in setting $\Delta n \cdot d$ at 0.83 $\mu$m with the nematic liquid crystal CR-4008 manufactured by Chisso Co. As is understood from FIG. 9, a satisfactorily bright and high contrast can be obtained if the pretilt angle $\theta_0$ is not less than 10°, preferably not less than 25°.

Figure 10:
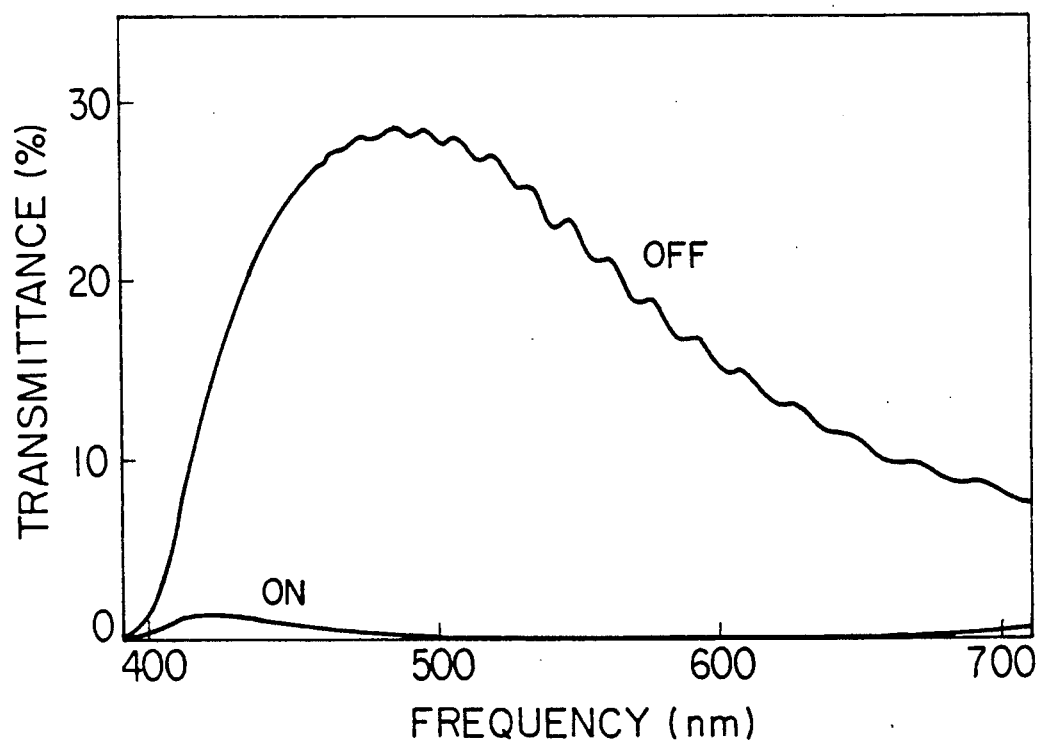
FIG. 10 is illustrates a transmission spectrum of a liquid crystal cell with a pair of polarizing plates.

In the invention, the backlight source has a red light luminous intensity of 1.2 times or more, preferably 1.5 to 2.5 times as much as those of the green and blue light. The emission spectrum of the backlight source adjusted as above to make the red light luminous intensity higher results in a satisfactorily flat spectrum of a transmission light through the liquid crystal cell and a display having an excellent achromatic property. It is hard to make the transmission spectrum completely flat only by adjusting the angles $\beta$ and $\gamma$. An ON-OFF contrast can be increased by a conventional backlight source, but a transmitted light is tinted with blue and, it is difficult to completely prevent tinting, because the transmittance of the red light wavelength region is low in the transmission spectrum of the liquid crystal cell in applying an OFF voltage, as shown in FIG. 10.

In the invention, red light, green light and blue light are defined by light having the wavelength regions of about 580 to 800 nm, about 480 to 580 nm and about 400 to 480 nm, respectively.

The examples of the backlight sources applicable to the invention are a cold-cathode type fluorescent lamp, an incandescent cathode type fluorescent lamp, and an electroluminescent lamp. Among these light sources, the coldcathode type fluorescent lamp is particularly preferable from the viewpoints of luminous intensity, temperature and life.

Figure 16A:
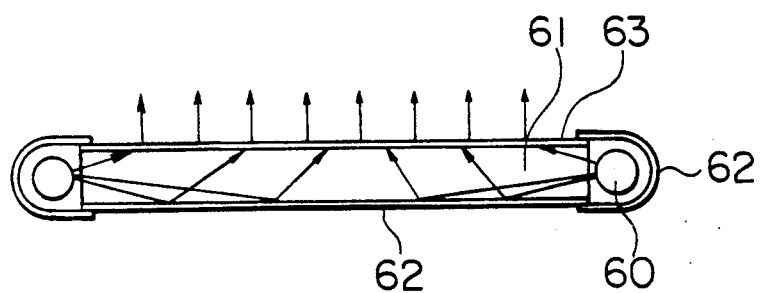
FIG. 16(a) is a schematic cross-sectional view showing a backlight source with a light-guiding plate.
Figure 16B:
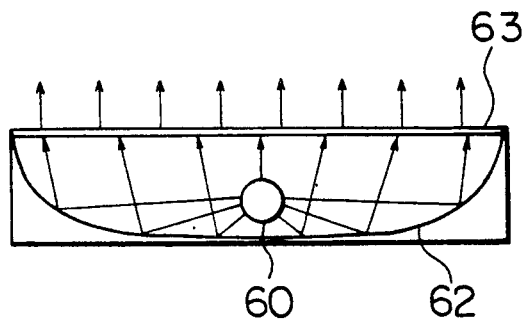
FIG. 16(b) is a schematic cross-sectional view showing a reflective scattering type backlight source.

In addition to the above, there can be used the sources of a surface illuminant type, a guide plate type as shown in FIG. 16(a), and a reflective diffusion type as shown in FIG. 16(b). In these figures, reference numeral 60 is a tubular light source, 61 is a guide plate, 62 is a reflecting plate, and 63 is a diffusion plate.

The higher luminous intensity of red light emitted from the backlight source can be achieved by making use of a light source capable of emitting high luminous intensity red light or by disposing filters on the backlight source so as to adjust the ratio of a red light luminous intensity to those of green and blue light.

In the invention, the backlight source has a luminous intensity of not less than 200 cd/m$^2$ and, more preferably not less than 400 cd/m$^2$. The backlight source having such high luminous intensity makes it possible to prevent an adverse effect caused by a surrounding light reflected from the front surface and reflected out of the liquid crystal cell, and provide a display having an excellent achromatic property. If the luminous intensity of the backlight source is less than 200 cd/m$^2$, tinting as is observed in a reflection mode is caused by light reflected from both of the back surface of a liquid crystal cell and the front surface of a backlight source, which is incident from the front surface of the liquid crystal cell under an ordinary room light illumination, so that it is difficult to provide a display having an excellent achromatic property.

The upper limit of the luminous intensity of the backlight source has no specific limit as far as heat of the backlight source adversely affects the liquid crystal.

The backlight source, of the higher luminance intensity consumes more electricity, and therefore it is preferable to increase the light transmittance of a liquid crystal cell including those of the polarizing plates to keep the necessary luminous intensity of the backlight source as low as possible.

In the invention, $\Delta n \cdot d$ and the angles $\beta$ and $\gamma$ of the polarizing plates are set in the specific ranges, respectively, so that the necessary luminous intensity of the backlight source can be kept lower because the light transmittance of the liquid crystal cell including those of the polarizing plates can be secured to be not lower than 20%.

In the invention, a polarization ratio of a polarizing plate is set at not less than 95% and, preferably not less than 99% for obtaining a higher contrast. If the polarization ratios of the polarizing plates are lower than the above, light leakage becomes larger in applying an ON voltage and a high contrast can not be provided even if the setting angles of the polarizing plates are optimized.

The present invention satisfies preferably the following conditions:

(1) the following equation is satisfied preferably by the spontaneous twist pitch $P_S$ of a nematic liquid crystal containing an optically active substance and by a compulsive twist pitch $P_C$ of a liquid crystal layer where a twisted structure is forcibly regulated with the alignment layers.

$$-0.1 < (P_C - P_S) / P_S < 0.3$$

(2) A splay elastic constant $k_{11}$ or a twist elastic constant $k_{22}$ of a nematic liquid crystal and a bend elastic constant $k_{33}$ satisfy preferably at least one of the following Equations 1 and 2:

$$1.8 < k_{33}/k_{22} < 2.8 \qquad \text{Equation (a)}$$

$$0.9 < k_{33}/k_{11} < 1.5 \qquad \text{Equation (b)}$$

(3) The ratio $\Delta\epsilon/\epsilon$, in which $\Delta\epsilon$ is a dielectric anisotropy of a nematic liquid crystal and $\epsilon\perp$ is a dielectric constant in a direction perpendicular to a longitudinal axis of liquid crystal molecules, is not less than 1.8.

The nematic liquid crystal satisfying the above preferable conditions (1) to (3) can provide the bistable phenomenon only slightly and further accelerate the response speed of the liquid crystal layer to switching ON and OFF of a driving voltage in multiplex.

(4) A transition temperature $T_{NI}$, at which a nematic liquid crystal phase is converted to an isotropic liquid phase, is preferably not lower than 90°. The nematic liquid crystal satisfying the above condition can regulate the variations in a displayed color, a driving voltage, and a response speed in a narrow range which are attributable to a temperature variation in a range of a normal operation temperature, and therefore the highly reliable liquid crystal display device can be provided.

(5) A refractive anisotropy $\Delta n$ of a nematic liquid crystal is preferably not less than 0.10 and more preferably in the range of not less than 0.12 to not more than 0.20.

The nematic liquid crystal satisfying the above condition can make the liquid crystal cell thinner and results in providing the liquid crystal display device capable of responding very quickly to switching ON and OFF.

(6) Viscosity $\eta$ of a nematic liquid crystal at 20° C. is preferably not higher than 30 cp. The nematic liquid crystal satisfying the above condition makes it possible to remarkably shorten a switching time of a liquid crystal cell, and the liquid crystal display device having more excellent response characteristic can be provided.

In the invention, a refractive anisotropy $\Delta n$, a splay elastic constant $k_{11}$, a twist elastic constant $k_{22}$, a bend elastic constant $k_{33}$, a dielectric anisotropy $\Delta\epsilon$, a dielectric constant $\epsilon\perp$, a transition temperature $T_{NI}$, and a viscosity $\eta$ are the physical properties of a nematic liquid crystal containing no optically active substance. In practice, since only a very small amount of the optically active substance is added, there scarcely exists the difference between the physical properties of the nematic liquid crystals containing and not containing the substance.

The pretilt angle $\theta_0$ can be measured by a magnetocapacitive null method described in J. Appl. Phys., 48, 1783, (1977).

In the invention, the angle $\beta$ is the setting angle of the polarizing plate on the incident light side, and the angle $\gamma$ is the setting angle of the polarizing plate on the outgoing light side. The setting angle is defined by the intersection of the projected direction of the director (a vector showing the average direction of the longitudinal axes of the liquid crystal molecules) of the liquid crystal molecules contacting an electrode substrate, and a polarizing axis (a transmittance axis or an absorption axis) of a polarizing plate disposed on the electrode substrate. The angles $\beta$ and $\gamma$ of the polarizing plates are converted to the values ranging from $-90°$ to $+90°$, for example, the angle $\beta$ of 135° is converted to the angle $\beta$ of $-45°$.

The projected direction of the director of the liquid crystal molecules contacting the electrode substrate usually corresponds to the direction of an aligning treatment of an alignment layer on the electrode substrate. The direction of the aligning treatment corresponds to that of evaporation-deposition where the aligning treatment is performed in an oblique evaporation-deposition method, and to a rubbing direction where it is performed in a rubbing method.

The polarizing axes of the polarizing plates may be either a transmittance axis or an absorption axis. Where both of the angles $\beta$ and $\gamma$ depend either on the transmittance axes or the absorption axes, the display device can have a normally open display mode in which a light transmission state is in applying an OFF voltage and a non-light transmission state in applying an ON voltage.

Figure 11:
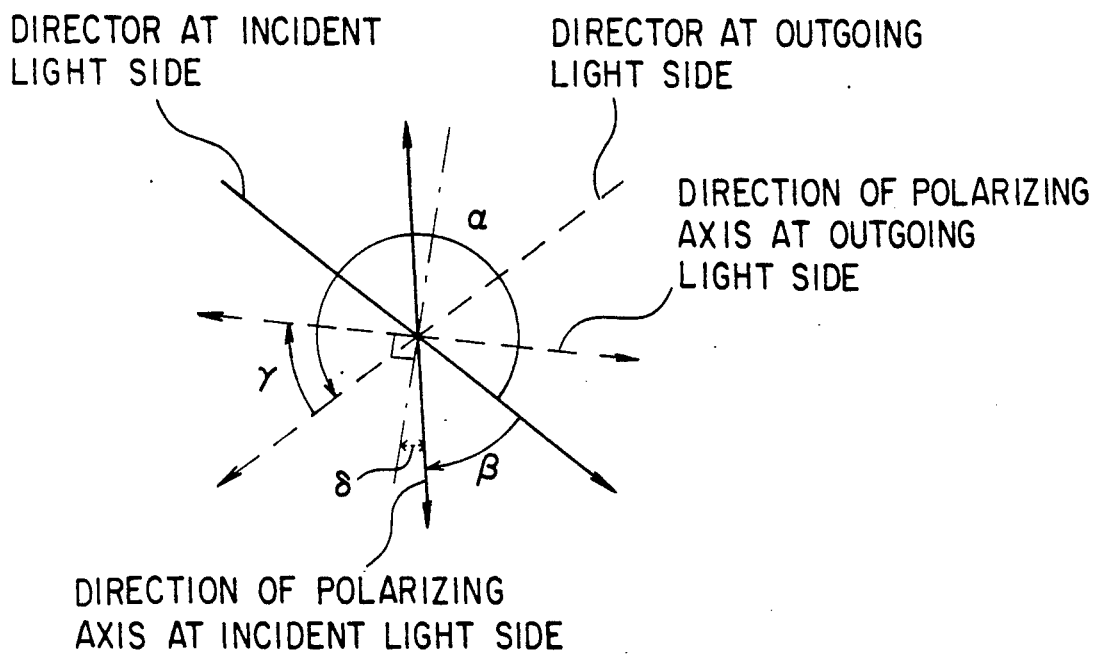
FIGS. 11 and 12 each illustrate the relations between the twist angle $\alpha$ and the angles $\beta$ and $\gamma$.
Figure 12:
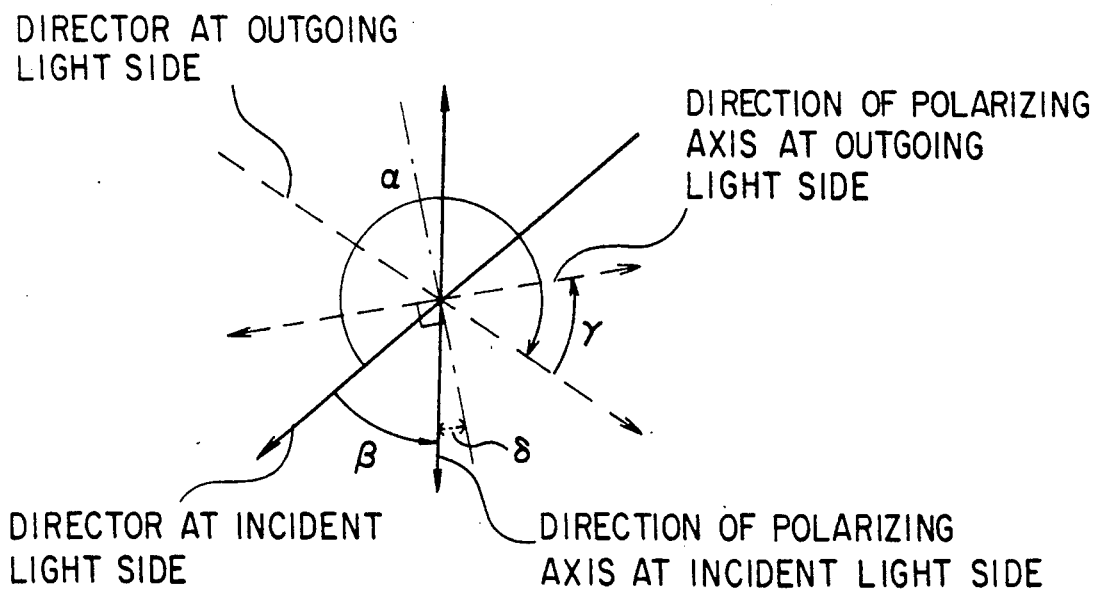

The signs of the angles $\beta$ and $\gamma$ are defined in the following manner. As shown in FIG. 11, where a twist direction of liquid crystal molecules is counterclockwise along a propagating direction of incident light, a positive sign is assigned to a clockwise direction toward the direction of a polarizing axis from the director of liquid crystal molecules in contact with an electrode substrate. Meanwhile, as shown in FIG. 12, where a twist direction of liquid crystal molecules is clockwise along the propagating direction of incident light, a positive sign is assigned to a counterclockwise direction.

Figure 13:
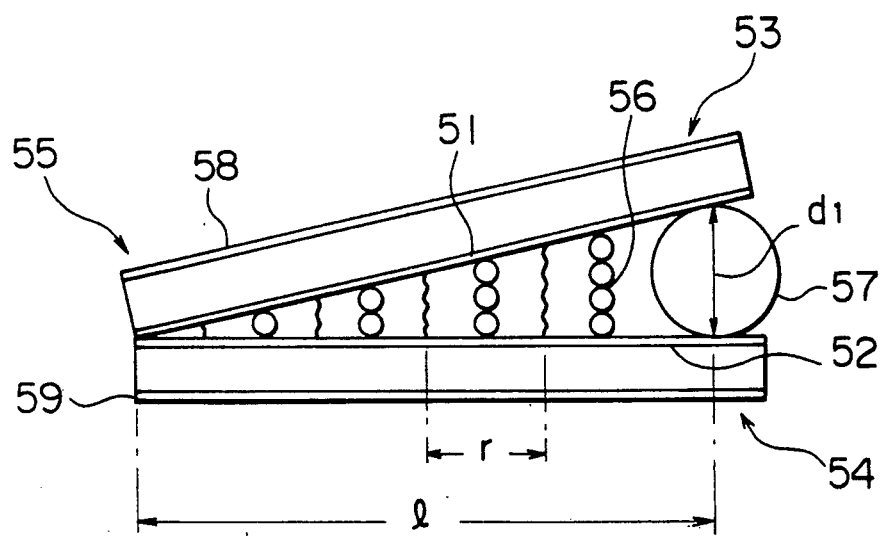
FIG. 13 illustrates a device for measuring a spontaneous twist pitch $P_s$.

The spontaneous twist pitch $P_S$ is defined by a pitch in an intrinsic twist configuration of a liquid crystal layer, which is formed by adding an optically active substance to a nematic liquid crystal. To be more concrete, the spontaneous twist pitch $P_S$ can be determined in accordance with the following equation given below and in the following manner: As shown in FIG. 13, a liquid crystal cell 55 is formed by arranging wedgewise the electrode substrates 53, 54 having the alignment layers 51, 52 so that the alignment layers are oppositely disposed. Then, a to each other, respectively, and nematic liquid crystal 56 is sealed in the liquid crystal cell 55, and the interval r of the striped pattern (a disclination line per ½ twist pitch) which is observed in the liquid crystal cell 55, the thickness dl of the thick side of a liquid crystal layer, and the length l of the liquid crystal cell 55 are measured to determine spontaneous twist pitch $P_S$ from the following equation:

*Spontaneous twist pitch $P_S = 2d_1 r/l$*

In FIG. 13, 57 is a spacer, and 58, 59 are the polarizing plates. Alignment layers 51, 52 are aligned so that the direction of aligning treatment are parallel to each other.

Compulsive twist pitch $P_C$ is defined by the following equation:

*Compulsive twist pitch $P_C = (360°/\alpha) \times d$* wherein d is the thickness of a liquid crystal layer and $\alpha$ is a twist angle.

$k_{33}/k_{22}$ and $k_{33}/k_{11}$ can be determined by the method where the values thereof are determined by a threshold value of an electrical capacity variation or a threshold value of an optical variation observed in applying a magnetic field to a uniformly aligned liquid crystal cell, described in H. Gluler et al, Z. Naturforsch, 279, (1972), 966; another method where they are determined by a variation of an electrical capacity observed in applying an electric field to a uniformly aligned liquid crystal cell, described in H. Deuling, Mol. Cryst. Liq. Cryst. 19, (1972) 123.

A brightness is herein evaluated in terms of the level of the transmittance represented by luminance value Y, and a contrast value is evaluated in terms of a $Y^{OFF}/Y^{ON}$ ratio in which $Y^{OFF}$ and $Y^{ON}$ represent the luminance values in applying an OFF and ON voltage, respectively.

The materials for the transparent substrates 11A and 12A are glass such as soda glass, borosilicate glass and quartz glass; and plastic sheets made of uniaxial oriented polyethylene terephthalate, polyether sulfone and polyvinyl alcohol.

The electrode layers 11B and 12B are composed of the transparent electrodes having ITO (oxide of tin and indium) and tin oxide each provided on the surfaces of the transparent substrates 11A and 12A.

The alignment layers 11C and 12C can be provided by the conventional methods. In the invention, the following methods are particularly preferable because it requires to set the pretilt angle $\theta_0$ at 10° or more:

1. A method where an evaporation-deposition material such as SiO, MgO and $MgF_2$ is deposited obliquely on the surface of an electrode substrate.

2. A rubbing method where on the surface of an electrode substrate is provided a layer of a polymer material such as polyimide, polyamide, polyvinyl alcohol and polyphenoxy each having a non-polar long chain structure in a principal or side chain, and the layer surface is rubbed with a woven, flocked or loose-woven cloth each made of cotton, vinylon, tetron, nylon, rayon, or carbon fibers. The preferable polymer material is polyimide, RN-369, RN-715 and RN-729 manufactured by Nissan Chemical Industries Co.

3. A rubbing method where on the surface of an electrode substrate is formed a layer of an aligning agent prepared by mixing a homogeneous aligning agent such as polyimide, polyamide and polyvinyl alcohol with a homeotropic aligning agent such as a chromium carboxylate complex and a organic silane compound, and the surface of the layer is rubbed.

4. A method where on the surface of an electrode substrate is formed the grooves gratingwise in a uniform direction by means of a photolithography or anisotropic etching to align the liquid crystal molecules.

5. A method where on the surface of an electrode substrate is formed an LB (Langumuir-Blodgett) layer.

In the invention, it is preferable to provide a light-shielding layer on the non-picture element regions of an electrode substrate, which can prevent light leakage from the non-picture element regions, so that the non-picture element regions can be darkened more and the contrast can be further increased.

The light-shielding layer is composed of a metal layer such as chromium and nickel, a layer containing black silver dispersed in an insulating binder such as gelatin, or a layer containing a dye or pigment dispersed in an insulating binder.

Further, the upper and lower electrode substrates 11 and 12 may be provided with an insulating layer, a dielectric layer, an alkali-ion migration preventive layer, an antireflection layer, and a polarizing layer.

It is preferable to use such a transparent substrate, an electrode layer, an alignment layer, other layers, and a polarizing plate, as do not weaken the luminous intensity of light incident from a backlight source as much as possible.

In the invention, there may be provided at least three different color filters red, green and blue, which correspond to the respective picture elements. These filters make it possible to provide a color display having a high color-purity.

The color filters can be formed preferably by coating an emulsion layer containing a silver halide dispersed in an insulating binder such as gelatin and developing the emulsion layer by a silver salt photographic process. The color filters may be formed by a dyeing process, a printing process, or an electrodeposition process.

Various kinds of the nematic liquid crystals can be used.

The nematic liquid crystals applicable to the invention may contain smectic and cholesteric liquid crystals.

As for the optically active substance which may be added to the nematic liquid crystal, a so-called chiral nematic liquid crystal is generally used, which is an ester, biphenyl, phenylcyclohexane or azo type nematic liquid crystal having an optically active group represented by the following formula as a terminal group:

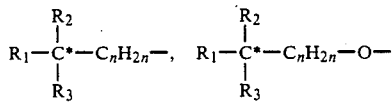

wherein $R_1$, $R_2$ and $R_3$ each represent an alkyl group and a hydrogen atom and are different from each other.

There can also be used chiral smectic and cholesteric liquid crystals as the optically active substance.

The optically active substances applicable to the invention are preferably those capable of shortening a spontaneous twist pitch per unit amount added to the nematic liquid crystal. Such optically active substances can control an addition amount thereof to a lower level, preferably not more than 2.0 % by weight. As a result, there can be minimized the lowering of transition temperature $T_{NI}$ from the nematic liquid crystal to the isotropic liquid, caused by the addition of the optically active substances, and the temperature dependence of the spontaneous twist pitch can also be reduced. In order to reduce the temperature dependence of the spontaneous twist pitch, there may be used in combination some kinds of the optically active substances having the reverse signs of the temperature variation coefficient of the spontaneous twist pitch.

EXAMPLE

Figure 14:
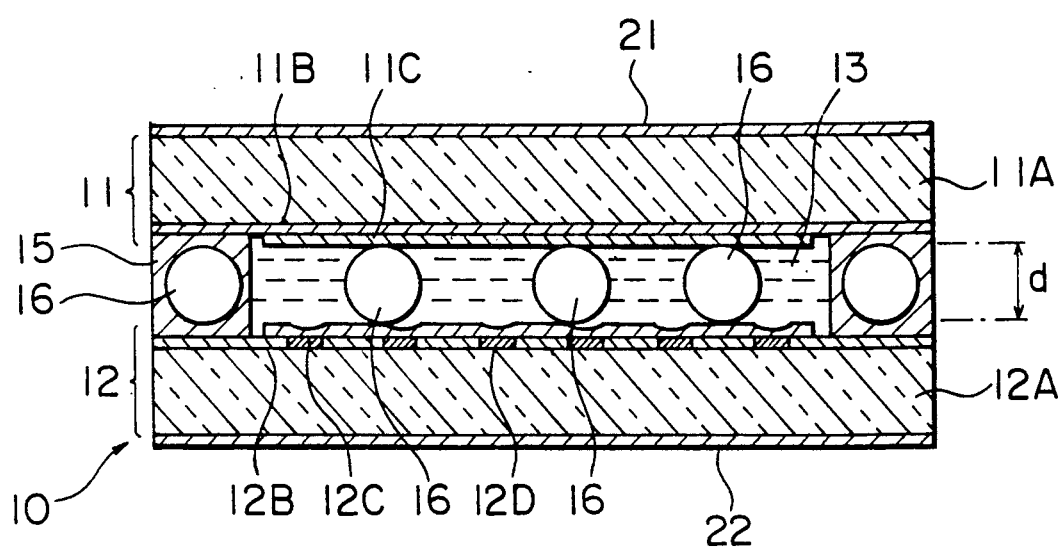
FIG. 14 is a schematic cross-sectional view showing a liquid crystal cell.

FIG. 14 is a schematic illustration of a liquid crystal cell 10, wherein the upper electrode substrate 11 and the lower electrode substrate 12 are disposed oppositely via a space.

The electrode substrates comprise the electrode layers 11B, 12B and the alignment layers 11C, 12C provided on the transparent substrates 11A, 12A so that the respective electrode layers and alignment layers are opposite each other via the space. A light-shielding layer 12D is provided on a non-picture element area.

The space between the electrode substrates is sealed with a sealing member 15 to constitute the liquid crystal cell 10. There are disposed in the liquid crystal cell 10 a plurality of spacers 16 separately, and a nematic liquid crystal containing an optically active substance and having a positive dielectric anisotropy, in which there is formed the twisted structure with a twist angle ranging from 220° to 300°, whereby a liquid crystal layer 13 is formed.

The front and rear polarizing plates 21 and 22 are disposed on the outside surfaces of the electrode substrates, respectively.

The transparent substrates 11A and 12A are composed of the soda glasses of which surface is polished to a flatness of not more than 0.1 μm and then is provided with an alkali-ion migration prevention layer of $SiO_2$.

The electrode layers 11B and 12B are composed of the transparent electrodes comprising an ITO layer provided on the transparent substrates and having a thickness of 1500Å.

A transparent electrode constituting the electrode layer 11B was arranged in the direction perpendicular to that of the other electrode layer 12B, whereby an electrode structure of a matrix display is formed.

The light-shielding layer 12D is composed of a gelatin layer in which black silver is dispersed.

The backlight source illustrated in FIG. 16(A), in which a cold-cathode fluorescent lamp is combined with a guide plate, is provided on the backside of the rear polarizing plate 22.

EXAMPLES AND COMPARISONS

In each of Examples and Comparisons, the liquid crystal cells having the structure shown in FIG. 14 were prepared in the conditions shown in Tables 1 and 2 given below and used for manufacturing the transmission type liquid crystal display device shown in FIG. 3.

The front and rear polarizing plates 21 and 22 were made of NPF-G1220DU manufactured by Nitto Electric Works Co. The spacer 16 was made of glass fiber and the sealing member 15 was made of Structbond XN-5A-C manufactured by Mitsui Toatu Chemicals, Inc.

Following are the properties of the liquid crystals used in Examples and Comparisons:

CR-4008: $k_{33}/k_{22} = 2.7$, $k_{33}/k_{11} = 1.1$, $\Delta\epsilon/\epsilon\perp = 2.4$, $\Delta n = 0.15$, $T_{NI} = 97.4°$, $\eta = 20$ cp;

ZLI-2293: $k_{33}/k_{22} = 2.5$, $k_{33}/k_{11} = 1.43$, $\Delta\epsilon/\epsilon\perp = 2.43$, $\Delta n = 0.132$, $T_{NI} = 85°$, $\eta = 21$ cp;

ZLI-3275: $k_{33}/k_{22} = 2.3$, $k_{33}/k_{11} = 1.19$, $\Delta\epsilon/\epsilon\perp = 2.3$, $\Delta n = 0.124$, $T_{NI} = 91°$, $\eta = 21$ cp.

EVALUATION

Each of the transmission type liquid crystal display devices were tested for displaying in multiplex driving at a 1/100 duty ratio and evaluated for a contrast, an achromatic property and a brightness. The achromatic property was evaluated by observing visually a displayed image. The results of the evaluation were ranked at 'O' as almost no tinting and a clear display; 'Δ' as slight tinting with no problem for practical use; and 'X' as serious tinting and inferior display.

The results of the evaluation are shown in Tables 1 and 2.

TABLE 1

| | Example 1 | Comparison 1 | Comparison 2 | Example 2 | Example 3 | Example 4 | Comparison 3 |
|---|---|---|---|---|---|---|---|
| Twist angle $\alpha$ | 270° | 270° | 270° | 270° | 260° | 270° | 270° |
| Pretilt angle $\theta_0$ | 41° | 41° | 41° | 39° | 27° | 15° | 8° |
| $\Delta n \cdot d$ | 0.87 | 0.63 | 0.97 | 0.79 | 0.81 | 0.75 | 0.79 |
| $\beta$ | 37° | 39° | 37° | 38° | 41° | 32° | 29° |
| $\gamma$ | 53° | 51° | 53° | 52° | 49° | 58° | 61° |
| $\delta$ | 16° | 12° | 16° | 14° | 18° | 26° | 32° |
| $(P_C - P_S)/P_S$ | 0.05 | 0.05 | 0.05 | 0.05 | 0.05 | 0 | 0.05 |
| Alignment layer | SiO Obliquely evaporated layer Thickness 1000 Å | SiO Obliquely evaporated layer Thickness 1000 Å | SiO Obliquely evaporated layer Thickness 1000 Å | SiO Obliquely evaporated layer Thickness 1000 Å | Rubbed polyimide layer RN-729 Thickness 700 Å | Rubbed polyimide layer RN-729 Thickness 700 Å | Rubber polyimide layer RN-066 Thickness 600 Å |
| Nematic liquid crystal | CR-4008 | CR-4008 | CR-4008 | ZLI-2293 | CR-4008 | CR-4008 | ZLI-2293 |
| $\Delta n$ | 0.15 | 0.15 | 0.15 | 0.132 | 0.15 | 0.15 | 0.132 |
| Thickness d of liquid crystal layer | 5.8 μm | 4.2 μm | 6.5 μm | 6.0 μm | 5.4 μm | 5.7 μm | 6.0 μm |
| Backlight luminous intensity ratio | | | | | | | |
| Red light/green light | 1.6 | 1.6 | 1.5 | 1.8 | 2.0 | 1.8 | 1.8 |
| Red light/blue light | 1.8 | 1.8 | 1.0 | 2.0 | 2.1 | 2.0 | 2.0 |
| Backlight luminous intensity | 700 cd/m² | 700 cd/m² | 700 cd/m² | 800 cd/m² | 600 cd/m² | 700 cd/m² | 800 cd/m² |
| Contrast | 125 | 105 | 85 | 240 | 85 | 40 | 23 |
| Achromatic property | O | O | X | O | O | O | O |
| Brightness $Y^{OFF}$ | 26% | 12% | 20% | 24% | 25% | 22% | 21% |

ZLI-2293 mfd. by Merck Co.
CR-4008 mfd. by Chisso Co.
RN-729, RN-066, mfd. by Nissan Chemical Ind. Co.

TABLE 2

| | Example 5 | Comparison 4 | Example 6 | Comparison 5 | Example 7 | Comparison 6 |
|---|---|---|---|---|---|---|
| Twist angle $\alpha$ | 260° | 260° | 270° | 270° | 270° | 270° |
| Pretilt angle $\theta_0$ | 39° | 7° | 41° | 41° | 41° | 41° |
| $\Delta n \cdot d$ | 0.79 | 0.60 | 0.83 | 0.83 | 0.83 | 0.83 |
| $\beta$ | 45° | 45° | 38° | 38° | 38° | 38° |
| $\gamma$ | 45° | 45° | 52° | 52° | 52° | 52° |
| $\delta$ | 10° | 10° | 14° | 14° | 14° | 14° |
| $(P_C - P_S)/P_S$ | 0 | −0.15 | 0.05 | 0.05 | 0.05 | 0.05 |
| Alignment layer | SiO Obliquely evaporated layer Thickness 1000 Å | Rubbed polyimide layer RN-066 Thickness 600 Å | SiO Obliquely evaporated layer Thickness 1000 Å | SiO Obliquely evaporated layer Thickness 1000 Å | SiO Obliquely evaporated layer Thickness 1000 Å | SiO Obliquely evaporated layer Thickness 1000 Å |
| Nematic liquid crystal | ZLI-2293 | ZLI-3275 | CR-4008 | CR-4008 | CR-4008 | CR-4008 |
| $\Delta n$ | 0.132 | 0.124 | 0.15 | 0.15 | 0.15 | 0.15 |
| Thickness d of liquid crystal layer | 6.0 μm | 4.8 μm | 5.5 μm | 5.5 μm | 5.5 μm | 5.5 μm |
| Backlight luminous intensity ratio | | | | | | |
| Red light/green light | 1.8 | 1.4 | 1.6 | 1.6 | 1.3 | 1.0 |
| Red light/blue light | 2.0 | 1.8 | 1.8 | 1.8 | 1.5 | 1.0 |
| Backlight luminous intensity | 700 cd/m² | 800 cd/m² | 300 cd/m² | 150 cd/m² | 700 cd/m² | 700 cd/m² |
| Contrast | 260 | 20 | 95 | 65 | 130 | 140 |
| Achromatic property | O | O | Δ | X | Δ | X |
| Brightness $Y^{OFF}$ | 25% | 14% | 22% | 22% | 22% | 22% |

ZLI-2293, ZLI-3275, mfd. by Merck Co.
CR-4008 mfd. by Chisso Co.
RN-066 mfd. by Nissan Chemical Ind. Co.

As can be understood from the results shown in Tables 1 and 2, the transmission type liquid crystal display devices of the invention can provide an excellent display having a high contrast and a superior achromatic property.

In contrast to the above, the comparative transmission type liquid crystal display devices have the inferior contrast, achromatic property and brightness.

Comparison 1 has an inferior brightness to Example 1 because of $\Delta n \cdot d$ less than 0.65.

The achromatic property of Comparison 2 is less improved than that of Example 1 because of Δn·d more than 0.90, even though the luminous intensity of the backlight source is controlled.

In Examples 3 and 4, the pretilt angles are smaller than in Example 1. The smaller the pretilt angle is, the lower the contrast becomes. In above Examples, the contrast has been able to reach the level of more than 30 because of the pretilt angle not less than 10°. The values of Δn·d are optimized by reducing them according to decreasing of the pretilt angle.

Comparison 3 has much inferior contrast than Example 2 due to the δ value larger than 30, which is attributable to the pretilt angle smaller than 10°, even though the setting angles of the polarizing plates are optimized.

Comparison 4 has the worse contrast and brightness than Examples because of the pretilt angle smaller than 10° and Δn·d smaller than 0.65, even though the bistability is increased by making (Pc−Psd)/Ps negative.

Example 6 has the inferior achromatic property because of the lower luminous intensity of the backlight source than Example 1, but the tinting is within an allowable level because of the luminous intensity of not less than 200 cd/m². On the contrary, Comparison 5 has the inferior achromatic property due to blue tinting which is attributable to the luminous intensity of the backlight source not more than 200 cd/m².

The achromatic property of Example 7 is not so good as those of other Examples because the luminous intensity ratios of red light to green light and blue light are smaller than those of other Examples, but within an allowable limit because of the ratios larger than 1.2. In Comparison 6, the achromatic property is inferior because of the luminous intensity ratios less than 1.2.

What is claimed is:

1. A transmission type liquid crystal display device comprising:
   a liquid crystal cell having a liquid crystal layer in which a nematic liquid crystal containing an optically active substance and having a positive dielectric anisotropy forms a twisted structure with a twist angle α ranging from 220° to 300° and is disposed between a pair of parallel electrode substrates each having a transparent substrate and provided thereon an electrode layer and an alignment layer so that the respective alignment layers contact the liquid crystal layer;
   a pair of front and rear polarizing plates each disposed on the side of the substrate opposite to the alignment layers; and
   a backlight source of illumination including red, green and blue light, said source being disposed on the side of the rear polarizing plate opposite to the substrate, wherein:
   (1) the produce Δn·d, in which Δn is a refractive anisotropy of the nematic liquid crystal and d is a thickness of the liquid crystal layer, is 0.65 to 0.90 μm;
   (2) in the relation to the twist angle α, angles β and γ defined by the intersection of polarizing axes of the pair of polarizing plates and the directions of aligning treatments of the alignment layers on the electrode substrates adjacent to the respective polarizing plates, and a correction angle δ satisfy the following Equations (a) and (b):

$$\alpha + \beta - \gamma - 180° = 90° - 80° < \delta < 30°$$  Equation (a)

$$\beta + \gamma = +90° \text{ or } -90°;$$  Equation (b)

(3) a pretilt angle $\theta_0$ defined by the intersection of the electrode substrate and a director of the nematic liquid crystal molecules contacting the electrode substrate is not less than 10°;
   (4) luminous intensity ratios of red light to green light and red light to blue light in the backlight source are 1.2 or more; and
   (5) a luminous intensity of the backlight source is not less than 200 cd/m².

2. The display device of claim 1, wherein the twist angle α ranges from 250° to 270°.

3. The display device of claim 1, wherein Δn·d and an average pretilt angle $\theta^{OFF}$ which is an average angle defined by the intersection of the electrode substrate and the director of the nematic liquid crystal molecules in applying an OFF voltage satisfy the following equation:

$$\Delta n \cdot d \cdot \cos^2 \theta^{OFF} = 0.68 \pm 0.05 \mu m$$

4. The display device of claim 1, wherein the angle β is determined according to the following equation:

$$\beta = \frac{360° - \alpha}{2} - \frac{\delta}{2}$$

5. The display device of claim 1, wherein the pretilt angle $\theta_0$ is not less than 25°.

6. The display device of claim 1, wherein the luminous intensity ratios of red light to green light and blue light are 1.5 to 2.5.

7. The display device of claim 1, wherein the luminous intensity of the backlight source is not less than 400 cd/m².

8. The display device of claim 1, wherein a polarizing ratio of the polarizing plates is not less than 95%.

9. The display device of claim 8, wherein the polarizing ratio is not less than 99%.

10. The display device of claim 1, wherein a spontaneous twist pitch Ps of the nematic liquid crystal containing an optically active substance, and a compulsive twist pitch Pc of the liquid crystal layer in which the twisted structure is forcibly regulated by the alignment layer, satisfy the following equation:

$$-0.1 < (Pc - Ps)/Ps < 0.3.$$

11. The display device of claim 1, wherein a spray elastic constant $k_{11}$ or a twist elastic constant $k_{22}$ and a bend elastic constant $k_{33}$ of the nematic liquid crystal satisfy at least one of the following Equations (c) and (d):

$$1.8 < k_{33}/k_{22} < 2.8$$  Equation (a)

$$0.9 < k_{33}/k_{11} < 1.5$$  Equation (b)

12. The display device of claim 1, wherein the ratio of Δε/ε is not less than 1.8, in which Δε is a dielectric anisotropy of the nematic liquid crystal and ε is a dielectric constant in a direction perpendicular to a maJor axis of liquid crystal molecules.

13. The display device of claim 1, wherein a transition temperature $T_{NI}$, at which a nematic liquid crystal phase is converted to an isotropic liquid phase, is not lower than 90°.

14. The display device of claim 1, wherein the refractive anisotropy isotropy Δn is not less than 0.10.

15. The display device of claim 14, wherein the refractive anisotropy is not less than 0.12 and not more than 0.20.

16. The display device of claim 1, wherein a viscosity η of the nematic liquid crystal at 20° is not more than 30 cp.

17. The display device of claim 1, wherein the alignment layers are provided by obliquely evaporation-deposited SiO, MgO or $MgF_2$, on the electrode substrate.

18. The display device of claim 1, wherein the alignment layers are provided by forming a layer of a polymer having a nonpolar long chain structure in a principal or side chain on the electrode substrate and then rubbing the surface of the layer with a woven, flocked or loose-woven cloth.

19. The display device of claim 18, wherein the polymer is polyimide, polyamide, polyvinyl alcohol or polyphenoxy.

20. The display device of claim 1, wherein said liquid crystal cell comprises picture elements spaced by a non-picture area and wherein a light-shielding layer is provided on the non-picture area.

* * * * *

UNITED STATES PATENT AND TRADEMARK OFFICE
CERTIFICATE OF CORRECTION

PATENT NO. : 5,048,933
DATED : September 17, 1991
INVENTOR(S) : Kazuo Asano It is certified that error appears in the above-identified patent and that said Letters Patent is hereby corrected as shown below:

Abstract item [57] line 12, change "-δ0°<" to -- -δ 0°<.

Claim 1, column 17, line 55, change "produce" to --product--.

Claim 1, column 17, line 67, change "-δ0°<" to -- -δ 0°<--.

Claim 11, column 18, line 56, change " (a) " to -- (c) --.

Claim 11, column 18, line 58, change " (b) " to -- (d) --.

Claim 12, column 18, line 63, change "maJor" to --major--.

Claim 14, column 19, line 2, Delete "isotropy"

Signed and Sealed this

First Day of November, 1994

*Attest:*

BRUCE LEHMAN

*Attesting Officer*       *Commissioner of Patents and Trademarks*